United States Patent Office 3,591,494
Patented July 6, 1971

3,591,494
METHOD OF REMOVING HYDROCARBONS FROM THE SURFACE OF AN AQUEOUS BODY
Willie W. Crouch and Clifford W. Childers, Bartlesville, Okla., assignors to Phillips Petroleum Company
No Drawing. Filed Jan. 30, 1969, Ser. No. 795,340
Int. Cl. E02b 15/04
U.S. Cl. 210—40
8 Claims

ABSTRACT OF THE DISCLOSURE

Hydrocarbons floating on an aqueous body are removed by contacting them with a fine powder which is a mixture of a polymer compatible with hydrocarbons and a water insoluble inorganic filler, whereby the powder absorbs the hydrocarbons and thereafter sinks to the bottom of the aqueous body.

BACKGROUND OF THE INVENTION

Bodies of hydrocarbons, such as crude oils or refined petroleum products, constitute a nuisance and hazard when they appear upon the surface of an aqueous body, such as the ocean or a fresh water lake. Such floating hydrocarbons oftentimes result from spills around harbor facilities, leakage from tankers or, more rarely, from damage to or sinking of a vessel carrying crude oil. Although infrequent, the latter occurrence can have disastrous effects upon beaches and marine life.

Various methods have been proposed for removing such hydrocarbons from the surface of an aqueous body. For example, it has been proposed to apply a powdered mineral such as asbestos, dolomite, magnetite and the like to the hydrocarbon. While such minerals absorb an appreciable amount of hydrocarbon and then sink, the oil is oftentimes released after a short period of time and thereafter rises to the surface again. It has also been proposed to add polymers, such as rubber latices to the floating body of hydrocarbon, the rubber latex containing the hydrocarbon being subsequently coagulated and the coagulum removed from the surface. In practicing this method, it is oftentimes necessary to add acidic material to the latex after it is sprayed onto the hydrocarbon in order to effectively coagulate the latex. It is then necessary to skim the coagulum from the surface of the water.

BRIEF STATEMENT OF THE INVENTION

In accordance with our invention, the floating hydrocarbons are contacted with a fine powdered material consisting essentially of an intimate mixture of a water insoluble inorganic filler and a minor amount of a polymer which is compatible with the hydrocarbons. The resulting admixture absorbs several times as much hydrocarbon per unit weight as the previously utilized minerals. The inorganic filler utilized in our invention has a density of greater than 2 grams per cubic centimeter, with the result that the mixture containing the absorbed hydrocarbons sinks to the bottom, and the hydrocarbons are not released for extended periods of time. This eliminates subsequent coagulation and skimming steps, and provides exceptionally rapid removal of the hydrocarbons from the surface of the aqueous body.

It is a feature of our invention that bacteria may be included in the powder which will effect or accelerate biodegradation of the hydrocarbons after they have been carried to the bottom by the polymer-filler mixture.

DETAILED DESCRIPTION OF THE INVENTION

Broadly speaking, the polymers utilized have an inherent viscosity of at least 0.2 and are compatible with the hydrocarbon which is to be removed from the surface of the aqueous body. Both rubbery and thermoplastic polymers are suitable, and it is a feature of the invention that the polymers need not be gel free. They may contain large amounts of gel, even up to 90 percent. Gel and inherent viscosity can be determined by the procedure of U.S. Pat. 3,278,508, column 20, notes a and b.

Generally speaking, improved results are obtained with higher molecular weight polymers having an inherent viscosity of 1.0 or higher. Specific examples of suitable polymers are polybutadiene, polyisoprene, natural rubber, butyl rubber, ethylene/propylene rubber (EPR), ethylene/propylene/diene monomer rubber (EPDM), butadiene/styrene copolymer, butadiene/acrylonitrile copolymer (having less than about 20 percent by weight acrylonitrile), crosslinked polystyrene, and rubber styrene graft polymers (impact polystyrenes).

From the standpoints of commercial availability and compatibility properties, we advantageously employ rubbery polymers with inherent viscosities of 2.0 or higher such as polybutadiene, butadiene/styrene copolymers (SBR), polyisoprene and natural rubber.

The water insoluble inorganic fillers can, broadly speaking, be minerals, ores, inorganic compounds or mixtures thereof having a density greater than 2.0 grams per cubic centimeter. Specific examples of inorganic fillers are andalusite, barite, chromite, pyrolusite, magnetite, dolomite, lead sulfate, lead dioxide, barium sulfate, zinc metasilicate, calcium molybdate, iron boride, iron sulfide, magnesium orthoborate, lithopone, clays (hard and soft), and portland cement.

Best results are obtained in the practice of our invention where the inorganic filler has a density greater than 3.5 grams per cubic centimeter and are utilized in a finely divided state. As will appear hereafter, the inorganic filler should be sufficiently small to pass through a 45-mesh wire screen (Tyler scale). The presence of some larger particles does not interfere unduly with practice of the invention so long as 0.2 to 2.5 pounds of polymer-powder mixture of smaller than 45 mesh is utilized per pound of hydrocarbon to be removed.

The mixtures of our invention can be utilized to remove hydrocarbons from various types of aqueous bodies such as seas, oceans, salt lakes, fresh water lakes and rivers. The hydrocarbons to be removed can be fuel oil, crude oil, or even refined products such as gasoline, lube oil or kerosene should they be spilled upon an aqueous body of the type heretofore indicated. Previously proposed systems have had great difficulty in removing spills of high gravity crudes, which are easily taken up by the mixtures of our invention.

The amount of polymer employed is not of the essence of the invention. Ordinarily the powdered mixture consists essentially of at least 5 percent by weight of hydrocarbon compatible polymer with the balance being made up by the water insoluble inorganic filler. We do not intend to exclude the presence of components such as polymer antioxidants from the powdered materials of our invention.

Particularly suitable mixtures for hydrocarbon removal are butadiene/styrene copolymers and barite, polyisoprene and iron sulfide, natural rubber and portland cement, polybutadiene and barium sulfate, polybutadiene and dolomite, butadiene/styrene copolymer and lithopone, polyisoprene and kaolin clay, and natural rubber and magnetite. Specific examples of mixtures falling within the broader aspects of the invention are butyl rubber and calcium molybdate, ethylene/propylene rubber and magnesium orthoborate, ethylene/propylene/diene rubber and iron boride, 90:10 butadiene/acrylonitrile copolymer and lead sulfate, crosslinked polystyrene and lead dioxide, and impact polystyrene and andalusite.

Various methods can be employed to effect an intimate admixture of the polymer and the water insoluble inorganic filler. For example, the solution or latex containing the polymer can be deposited in the form of small droplets or a spray on the surface of the filler while the mixture is being subjected to heat, reduced pressure, and a mixing action. The heat and reduced pressure drive off the polymer solvent or the water from the latex while the mixing action ensures homogeneity of the polymer-filler mixture and also minimizes agglomeration of polymer particles. Alternatively, heated streams of the filler and polymer latex or solution are passed through a mixing type nozzle which also subjects the mixture to an atomizing action. It is desirable that large lumps of polymer or polymer-filler mixture be eliminated or minimized. Any large lumps that do form can be reduced by attrition or grinding devices, such as ball mills.

Likewise, the polymer-filler mixtures can be contacted with the hydrocarbons to be removed by a variety of methods. For example, on small spills a single surface vessel can travel around the spill, spraying, blowing, or dusting the powdery material of this invention toward the center, until the spill has been sunk. On larger spills, several surface vessels can be employed. Aerial spraying can also be employed. Any conventional spraying or powder dispensing device can be employed with the oil-sinking agents of this invention. A mixing action is advantageous in promoting intimate contact of the powdery material and the oil. Normal wave action is generally sufficient for this purpose.

It is also within the scope of this invention to add microorganisms which consume or degrade hydrocarbons to the polymer-filler powder of this invention prior to the application of said powder to the hydrocarbon spill. Examples of such microorganisms are species of the genera Bacillus, Pseudomonas, and Nocardia. The added microorganisms along with those naturally occurring accelerate the biodegradation of the sunken hydrocarbon.

It will be apparent from the foregoing description that we have achieved the objects of our invention in providing a variety of mixtures of polymeric materials and inorganic fillers which will quickly absorb hydrocarbons floating upon an aqueous body and then sink, thus effectively and rapidly removing the hydrocarbons from the surface.

The following specific examples illustrate the application of our invention to removing hydrocarbons from aqueous bodies:

EXAMPLE I

Runs were conducted in which two different polybutadienes were employed to prepare polymer-filler powders of 20% by weight polymer. The polymer hereafter designated as polymer A was a commercially available polybutadiene prepared in a solution polymerization system with an inherent viscosity of about 2.3. Polymer B was prepared employing the following recipe.

Polymer B polymerization recipe

| | |
|---|---|
| Butadiene _____ parts by weight__ | 100 |
| Cyclohexane _____ do____ | 800 |
| n-Butyllithium _____ mhm a__ | 0.4 |
| Temperature, °C. _____ | 50 |
| Time, hours _____ | 3 | a Mhm.-gram millimoles per 100 grams of monomer.

The inherent viscosity of polymer B was 6.0.

Polymer-filler blends of this invention were then prepared in the following manner using polymers A and B above. Solutions of polymers A and B (10% by weight) were prepared in n-hexane. Each of these solutions was then blended with a 10% by weight slurry of barium sulfate in n-hexane. The relative amounts of the solutions were chosen such that the final product contained the desired 20% by weight of polymers. The mixtures of polymer and barium sulfate in n-hexane were then stirred with isopropyl alcohol to precipitate the polymer in the presence of the barium sulfate. The precipitated product was separated and dried and coarse particles removed by sifting the product through fine wire screen of about 35 mesh size (Tyler Scale). The powders prepared as described were then employed to sink oils of varying densities floating on the surface of 3.5% by weight aqueous sodium chloride solution which approximates the density of sea water. The powders were sprinkled by hand on the oil floating on the water surface. Table I presents the results of these runs.

TABLE I

| Run No. | Oil sinking agent | Crude oil density | Grams oil sunk per gram of agent (a) |
|---|---|---|---|
| 1 | Polymer A/barium sulfate | 0.99 | 0.9 |
| 2 | do | 0.92 | 0.7 |
| 3 | do | 0.82 | 0.8 |
| 4 | Polymer B/barium sulfate | 0.99 | 0.9 |
| 5 | do | 0.92 | 1.2 |
| 6 | do | 0.82 | 1.3 |
| 7 | Barium sulfate alone | 0.99 | 0.3 |
| 8 | do | 0.92 | -------- |
| 9 | do | 0.82 | 0.1 |

(a) Determined by the weight of powder required to sink all of a known weight of oil.

The above results show the polymer/barium sulfate blends of this invention to be several times more effective than barium sulfate alone in sinking oil. The results also indicate the polymer/barium sulfate blend containing the higher molecular weight polymer (polymer B) is more efficient than the blend containing the lower molecular weight polymer (polymer A), especially for sinking the lower density crude oils.

EXAMPLE II

Other runs were made according to this invention which employed polybutadiene latexes to prepare the polymer/barium sulfate mixtures of this invention. The recipe employed for the preparation of these latexes is shown below.

Polymerization Recipe

| | Parts, by weight |
|---|---|
| Butadiene _____ | 100 |
| $H_2O$ _____ | 150 |
| Potassium fatty acid soap (KFA) _____ | 5.0 |
| KOH _____ | 0.03 |
| Daxad 15 a _____ | 0.20 |
| KCl _____ | 0.50 |
| Questex 4SW b _____ | 0.04 |
| $FeSO_4 \cdot 7H_2O$ _____ | 0.0125 |
| $NaSO_2CH_2OH \cdot 2H_2O$ _____ | 0.0625 |
| p-Menthane hydroperoxide _____ | 0.0787 |
| Sulfole * 120 c _____ | Variable |
| Divinylbenzene (DVB) _____ | Variable |
| Shortstop: | |
|     Thiostop N d _____ | 0.16 |
|     BLE e _____ | 1.7 |
| Temperature, °C. _____ | 5 |
| Time, hours _____ | Variable | a Sodium salt of condensed alkyl aryl sulfonic acid.
b Tetrasodium salt of ethylenediamine tetraacetic acid having four moles of water of hydration.
c Mercaptan prepared from propylene tetramer.
d Sodium dimethyldithiocarbamate.
e High temperature reaction product of diphenylamine and acetone.
*Trademark.

The polymerization results are shown hereafter for these runs.

TABLE II

| Run No. | Sulfole 120,[1] phm. | DVB, phm. | Time, hours | Conv. percent | Inherent viscosity | Gel percent | Swelling index |
|---|---|---|---|---|---|---|---|
| 1 | 0.03 | 0 | 6.3 | 65 | 2.00 | 70 | 64 |
| 2 | 0.06 | 0 | 6.3 | 65 | 2.61 | 67 | 50 |
| 3 | 0.3 | 0 | 6.3 | 65 | 2.64 | 0 | |
| 4 | 0.25 | 0 | 19 | 97 | 1.12 | 85 | 52 |
| 5 | 0.25 | 0.1 | 6.2 | 65 | 2.21 | 7 | 143 |

[1] Trademark

Each of the above latexes were mixed with barium sulfate by addition of the latex, containing a known amount of polymer, dropwise to a known weight of barium sulfate while heating and stirring the mixture to provide a powdery material containing 11% by weight of the polybutadiene. The powders prepared from each of the above latexes were then applied to oil (density 0.82 g./ml.) floating on water in the manner employed in Example I. The results of these runs are presented in Table III.

TABLE III

| Run No. | Latex of Run No. of Table II | Grams oil sunk per gram of powder |
|---|---|---|
| 1 | 1 | 1.3 |
| 2 | 2 | 1.1 |
| 3 | 3 | 0.8 |
| 4 | 4 | 1.3 |
| 5 | 5 | 1.3 |

The above results demonstrate that the polymer-filler blends of this invention can readily be prepared from polymer latexes. The results also indicate the desirability of employing a relatively high molecular weight and/or cross-linked polymer to improve the oil sinking efficiency of the polymer-filler agents of this invention.

EXAMPLE III

Another polybutadiene latex was prepared for use in this invention. The polymerization recipe employed was the same as that of Run No. 5 of Example I with the exception that 155 parts of water was used rather than 100 parts. Polymerization time was 8.5 hours and a conversion of 69% was obtained. The polymer had an inherent viscosity of 2.13 and a gel content of 8%. The above latex was used to prepare polybutadiene/barium sulfate mixtures of varying polybutadiene content in the manner employed in Example II. In addition, each of the powdery products was ground so that all of the material would pass through a 35 mesh (Tyler Scale) wire screen. Each of these powders was then applied to sink 0.82 g./ml. oil floating on water in the manner employed in Example I. The results of these runs are given in Table IV below.

TABLE IV

| Run No. | Polybutadiene, percent by weight | Grams oil sunk per gram of powder |
|---|---|---|
| 1 | 9 | 1.1 |
| 2 | 11 | 1.25 |
| 3 | 13 | 1.3 |

The results of Table IV demonstrate that oil sinking efficiency of a polymer-filler agent of this invention is improved by increasing the polymer content from 9 to 13%.

EXAMPLE IV

A series of runs was conducted which employed the latex of Example III in preparing a polybutadiene/barium sulfate mixture containing 11% by weight polybutadiene. In these runs the effect of the particle size of this mixture on oil (0.82 g./ml.) sinking efficiency was determined. The results of these runs are shown in Table V.

TABLE V

| Run No. | | Percent of batch retained | Grams oil sunk per gram of powder |
|---|---|---|---|
| 1 | 20 mesh | 40.7 | 0.08 |
| 2 | 35 mesh | 7.1 | 0.3 |
| 3 | 65 mesh | 32 | 1.28 |
| 4 | Pan | 20.2 | 1.34 |
| 5 | (a) | | 1.15 |
| 6 | (b) | | 0.8 | a Material retained on 20 mesh, then ground and passed through 35 mesh.
b Total batch unsifted.

Tyler Scale mesh size was employed in these runs. The method of application of the powders in these runs was the same as that employed in Example I.

The results in Table V demonstrate that decreasing the particle size of the polymer-filler oil sinking agents of this invention increases their oil sinking efficiency.

Other variations and modifications of this invention will be apparent to those skilled in the art without departing from the spirit and scope of the invention.

We claim:

1. The method of removing hydrocarbons from the surface of an aqueous body which comprises contacting the hydrocarbons with a fine powdered material consisting essentially of a minor amount of a polymer having an inherent viscosity greater than 0.2 and compatible with the hydrocarbons, and the balance a water insoluble inorganic filler having a density greater than 2 grams per cubic centimeter, whereby the powder adsorbs the hydrocarbons and thereafter sinks to the bottom of the aqueous body.

2. The method of claim 1 wherein the polymer is rubber present in the amount of at least 5 percent by weight of the powdered mixture.

3. The method of claim 1 wherein the fine powdered material consists essentially of 5 to 25 percent by weight of a rubbery polymer selected from polybutadiene, butadiene/styrene copolymers, polyisoprene and natural rubber and the balance inorganic filler selected from andalusite, barite, chromite, pyrolusite, magnetite, dolomite, lead sulfate, lead dioxide, barium sulfate, zinc metasilicate, calcium molybdate, iron boride, iron sulfide, magnesium orthoborate, lithopone, clays and portland cement.

4. The method of claim 2 wherein the rubbery polymer has an inherent viscosity greater than 2 and the inorganic filler has a density greater than 3.5 grams per cubic centimeter.

5. The method of claim 4 wherein the rubbery polymer is polybutadiene and the inorganic filler is barium sulfate.

6. The method of claim 3 wherein the fine powdered material contains 0.2 to 2.5 pounds of inorganic filler having a size smaller than 45 mesh per pound of hydrocarbon to be removed, the hydrocarbons are selected from crude oil, fuel oil and refined petroleum products, and the aqueous body is a sea, ocean or fresh water lake.

7. The method of claim 6 wherein the powdered material is prepared by spraying a rubber solution or latex on the inorganic filler while heating and agitating the mixture.

8. The method of claim 6 wherein the powdered material is prepared by spraying the inorganic filler and rubber solution or latex in heated condition through a mixing nozzle.

References Cited
UNITED STATES PATENTS

| | | | |
|---|---|---|---|
| 2,464,204 | 3/1949 | Baker | 210—36 |
| 3,265,616 | 8/1966 | Wyllie et al. | 210—39 |
| 3,497,450 | 2/1970 | Roth | 210—40X |

SAMIH N. ZAHARNA, Primary Examiner

U.S. Cl. X.R.

210—oil-water digest